United States Patent [19]
Stricker

[11] Patent Number: 5,681,072
[45] Date of Patent: Oct. 28, 1997

[54] SOUND ABSORBER FOR MOTOR VEHICLES

[75] Inventor: Klaus Stricker, Bietigheim-Bissingen, Germany

[73] Assignee: Georg Naher GmbH, Markgroeninger, Germany

[21] Appl. No.: 419,993

[22] Filed: Apr. 11, 1995

[30]    Foreign Application Priority Data

Apr. 15, 1994 [DE] Germany ................. 44 13 009.0

[51] Int. Cl.⁶ ........................................... B62D 25/16
[52] U.S. Cl. .................. 296/39.3; 296/198; 181/205; 181/290; 181/291
[58] Field of Search ..................... 296/39.3, 198; 280/847, 848, 849, 850, 851; 181/198, 205, 284, 290, 291

[56]          References Cited

U.S. PATENT DOCUMENTS

| | | | |
|---|---|---|---|
| 4,013,302 | 3/1977 | Oswald | 280/851 |
| 4,313,524 | 2/1982 | Rose | 181/291 |

FOREIGN PATENT DOCUMENTS

| | | |
|---|---|---|
| 454949 | 11/1991 | European Pat. Off. . |
| 2127505 | 12/1972 | Germany . |
| 80 31 870 | 5/1981 | Germany . |
| 33 43 402 | 6/1985 | Germany . |
| 3039651 | 7/1985 | Germany . |
| 36 15 360 | 11/1987 | Germany . |
| 90 10 136 | 10/1990 | Germany . |
| 41 19 783 | 12/1992 | Germany . |
| 9301234 | 4/1993 | Germany . |
| 41 37 706 | 5/1993 | Germany . |
| 42 41 518 | 2/1994 | Germany . |
| 1678668 | 9/1991 | U.S.S.R. . |

*Primary Examiner*—Andrew C. Pike
*Attorney, Agent, or Firm*—Gary M. Nath; Nath & Associates

[57]          ABSTRACT

A sound absorber for motor vehicles is constructed in the form of a double-wall, flat resonant body (1) with a perforated front wall (3) facing the noise source and a substantially unperforated rear wall (4). The sound absorber is constructed as a combined plate/perforated resonator and is able to absorb both high and lower frequencies.

16 Claims, 3 Drawing Sheets

SOUND ABSORBER FOR MOTOR VEHICLES

BACKGROUND

The invention relates to a sound absorber for motor vehicles in the form of a double-wall, flat resonant body having a front wall with numerous holes and a substantially unperforated rear wall.

Noises caused by motor vehicles are a problem which is becoming increasingly urgent with the rise in traffic density. On one side an attempt is being made to design vehicles in such a way that avoidable noise does not occur, whilst on the other side an attempt is being made to eliminate unavoidable noise by suitable soundproofing measures in the vicinity of their formation point.

German Patent DE 36 15 360 C2 and European patent EP 454 949 A2 disclose flat, sound-damping elements, which are constructed as Helmholtz resonators. The sound-damping elements are preferably used as engine shielding or compartmentalization means. As a rule the resonators comprise a double-wall plate element, in which a perforated plate faces the sound generator, e.g., an engine, and an unperforated plate remote from the sound generator serves as the rear wall. Individual or groups of holes in the perforated plate are associated with acoustically separated chambers in the area between the two plates and which form the resonant chambers. Different sizes of chambers give resonance and therefore sound damping in different frequency ranges, so that a relatively wide frequency range can be covered. The individual resonant chambers can be formed by lattice-like partitions in the area between the two plates or by a corresponding chamber-like shaping of the plate surface, accompanied by the formation of the resonant chambers. The individual resonant chambers are separated from one another either completely or at least in an acoustically effective manner. For example, with respect to FIG. 3 of DE 36 15 360 C2 it is described that the known cavity resonators are effective in ranges between 500 and 8,000 Hz. However, problems are encountered with sound damping in the lower frequency ranges, particularly around 200 Hz and lower.

There are also mats, which are compressed in such a way that they are only air-permeable to a limited extent. As a result of an irregular construction of the wall thickness of the mats it is possible to achieve a more than 50% sound absorption in the frequency range 500 to 2,000 Hz (cf. DE 30 39 651 C2). However, here again no sound damping in the lower frequency range is possible. In addition, such mats tend to clog in the case of dirt access, so that they cannot be used in the outer area of motor vehicles.

A problem addressed by the present invention is to provide a sound absorber, which can be constructed in a dirt-insensitive manner and which is therefore also usable in the outer areas of motor vehicles and which permits a good absorption in a wide frequency range, particularly at low frequencies of 250 Hz and below.

SUMMARY OF THE INVENTION

The sound absorber according to the invention is characterized in that it is constructed as a combined plate/perforated resonator.

In the case of the aforementioned Helmholtz resonators, which belong to the perforated resonators, sound absorption takes place by suppressing the air vibrations in the holes of the perforated plate in conjunction with the resonant chamber located behind the holes. In the case of plate resonators sound absorption takes place by suppressed resonant vibrations of a closed absorber front plate facing the sound force. According to the invention there is a combination of both resonators; the number of holes and the size of the holes in the front plate and the natural vibratability of the front plate are so matched to one another that absorption takes place in the holes for reducing the sound in the higher frequency range and there is also sound absorption by exciting the perforated front plate to vibrate, in order to bring about absorption in the lower frequency range, particularly of 250 Hz and below. This makes it possible to achieve an effective sound absorption down to the second and third engine order.

In a preferred embodiment of the invention between the front wall and the rear wall there is a common cavity for all of the holes of the front side, which means that the common cavity is free from acoustic partitioning.

The front wall of the sound absorber is advantageously constructed as a vibratable perforated plate. The total cross section of the holes of the front wall is kept so small compared with the square dimensions of the front wall that part of the absorbed sound energy is dissipated in the holes, whereas another part of the sound energy is dissipated by vibrations of the front wall. The front wall vibrations can be damped both by mechanical damping means and also by air enclosed in the cavity. In the case of the sound absorber according to the invention there are numerous parameters which can be matched to one another so that optimum absorption characteristics are achieved for the intended use of the absorber. Thus, for otherwise constant parameters, e.g., an increase in the cavity volume leads to a shift of the absorption towards the lower frequencies. A reduction in the percentage of holes acts in the same direction. A larger material thickness of the perforated front plate or perforated film or foil also leads to a shift towards the lower frequencies. However, an increase in the size of the individual holes leads to an absorption shift towards higher frequencies. In order to effectively cover the largest possible frequency range, in the case of the sound absorber according to the invention the aim is to keep the volume of the common cavity between the front and rear walls as large as possible, so as to effectively cover low frequencies. Tuning to higher frequencies can then be easily carried out by the choice of the remaining parameters. If desired, additional precautions can be taken in the cavity in order to modify and in particular increase the absorption characteristics of the absorber, or to increase the mechanical stability of the absorber.

Thus, to the back of the perforated plate are fixed air-permeable and optionally also perforated sound damping mats. Such sound damping mats can also be provided in the interior of the sound absorber. This effectively increases the sound suppression. In an embodiment of the invention sound absorbing or damping mats are located on at least one inner wall of the absorber cavity, so that most of the cavity remains empty. In another embodiment the cavity is completely filled with fibrous material, e.g., cotton fiber fleece. The fleece or sound damping material can have a density of 30 to 300 kg/m$^3$, particularly approximately 80 kg/m$^3$.

Between the front and rear walls it is also possible to provide spacers or connecting webs, which serve to stiffen the absorber, particularly in the case of larger square dimensions and can be used in a planned manner for influencing the vibration characteristics of the perforated plate. The construction of ribs on the back of the perforated plate is also possible.

It is advantageous to use for the front wall a perforated plate or foil having a material thickness in the range 0.5 to 2 mm, particularly 0.8 to 1.5 mm. with such a material thickness adequate strength and good vibration characteristics are combined. The flexural rigidity of the front wall is preferably in the range 700 to 4,000 and in particular 1,000 to 2,500 N·mm$^2$. The flexural rigidity is also a variable parameter, which acts on the absorption characteristics. The cavity volume of the sound absorber is preferably in the range 1 to 100 and in particular 4 to 10 liters. This means that large-volume sound absorbers can be subdivided or partitioned, if the cavities of the partial absorbers in turn have a relatively large cavity volume, which is adequate for the action as a combined plate/perforated resonator.

The size of the holes is preferably in the range 1 to 3 mm internal diameter (relative to circular holes). The total cross section of the holes in the front wall is preferably below 10% and particularly below 5% of the surface of the front wall. Thus, the air resistance of the front wall is kept so high that the front wall vibrates. The holes separation can vary within wide limits and in practice a distance between the hole centers of 4 to 17 and in particular 7 to 11 mm has provided advantageous. Generally the hole spacing is approximately 9 mm. The holes can have different cross-sectional shapes, preference generally being given to circular holes.

The external shape of the sound absorber according to the invention is largely dependent on the space conditions in or on the motor vehicle. The front and rear walls are largely substantially parallel to one another. However, divergences are not prejudicial and can even be advantageous. Thus, the rear wall is advantageously shaped like a component of the motor vehicle or is roughly adapted thereto. The rear wall of the sound absorber according to the invention can generally be formed by a separate, two- or three-dimensional, shaped plastic plate, which is permanently and substantially tightly connected, e.g., welded to the front wall. The front and rear walls can be directly interconnected. Preferably there are substantially closed side walls, which interconnect the front and rear walls.

In a preferred embodiment of the invention the sound absorber is constructed as a wheel housing lining for absorbing tire noise. Such wheel housing sound absorbers are suitable both for cars, trucks and buses. The large number of sound absorber parameters which an be matched to one another makes it possible to match the absorption characteristics to the tire sizes and profiles determining the sound frequencies. The sound absorber according to the invention can be given a substantially circular arc configuration parallel to the tire tread within the wheel housing. It is advantageously also possible to shape the absorber in such a way that also other areas of the wheel housing are included, particularly parts of the wheel housing lateral face directed towards the wheel. The sound absorber constructed as a wheel housing lining cannot only absorb the direct rolling noise of the tire, but also noise produced by impacting spray water and small stones. Particularly for absorbing small stone noise it can be advantageous to elastically interconnect the sound absorber front and rear walls, so that also impacting solid-borne sound is damped and is not or only to a greatly reduced extent transferred to the vehicle body. The complete sound absorber can be fixed by elastic connecting means to the body in order to create additional damping measures.

The sound absorber can also be constructed as an engine cowling and as a motor encapsulation, particularly for encapsulating the engine area. In this case the perforations of the front wall of the sound absorber are directed towards the engine. When constructed as an engine cowling the sound absorber is advantageously constructed for fixing to the underside of the engine area.

If the sound absorber is intended to be fixed to a point which is exposed to spray water and the like, then the interior of the absorber is preferably free from any fine-pored elements, such as sound absorbing mats, etc. At the lowest points of the absorber cavity it is possible to provide water outlet holes, so that any penetrated water can escape. In general, the water outlet holes are larger than the absorption holes of the perforated plate, so that through the latter it is possible for any dirt which has penetrated to pass out again in an unhindered manner. At least if the water outlet holes do not simultaneously have the function of absorption holes, their total cross section is smaller and preferably at the most half as large as that of the absorption holes of the front wall. This measure serves to maintain the absorption functions of the holes of the perforated plate, which is determined not only by the cross section of the holes, but also by the damping function of the closed or at least substantially closed cavity.

If open sound absorption holes face the edges and/or the road surface, then the sound absorbers in the case of wet conditions can also trap whirled up spray water mist and can serve as additional spray water protection means. It is also possible to cover or span the perforated plate with a closed, flexible foil on the side facing the sound source. If desired, such a foil or sheet can bring about an effective sealing of the absorber against the penetration of spray water and other liquids. As a result of the flexibility of the foil or sheet the vibration characteristics of the perforated plate and the sound vibrations are not disadvantageously influenced through the hole. In order to increase the thermal stability of the sound absorber the outer spaces thereof can be covered with a metal foil, particularly an aluminum foil, which is optionally correspondingly perforated on the front of the perforated plate. Such metal foils are particularly advantageous when the sound absorber is constructed as an engine cowling, where the sound absorber is exposed to the temperature radiation of the engine block. At least the front wall of the sound absorber, and preferably substantially the entire sound absorber, is advantageously made from a thermoplastic material, particularly polypropylene. The sound absorber is recyclable as a whole. If desired, the thermoplastic material can also be fiber-reinforced, which does not impair its recyclability.

Further features of the invention can be gathered from the following description of preferred embodiments in conjunction with the drawings. The individual features of the invention can be implemented alone or combined with one another in an embodiment of the invention.

DETAILED DESCRIPTION OF THE PREFERRED EMBODIMENTS

Figure 1:
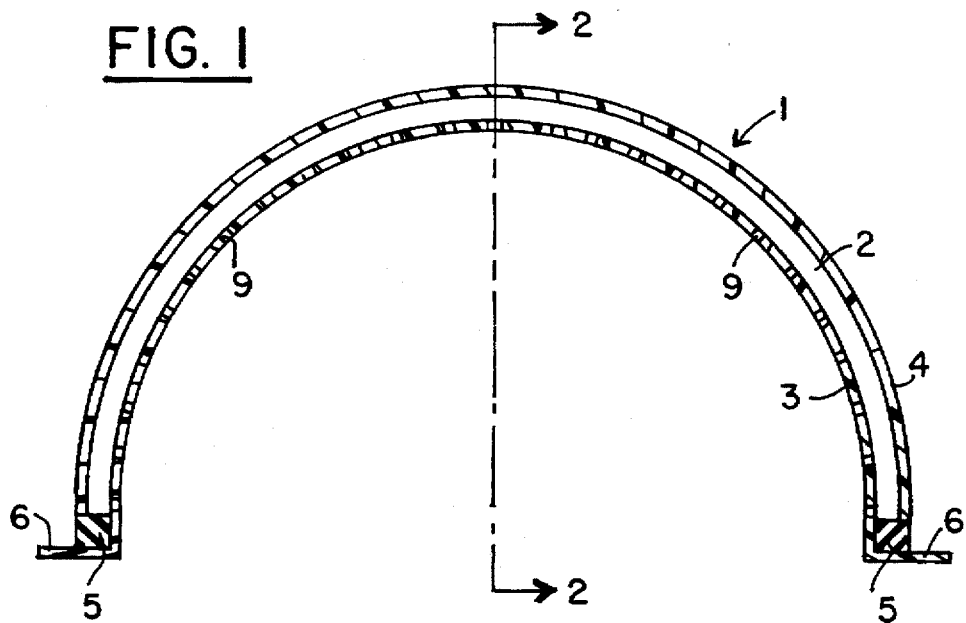
FIG. 1 is a longitudinal section through a sound absorber taken along line 1—1 in FIG. 2 according to the invention constructed as a wheel housing lining.
Figure 2:
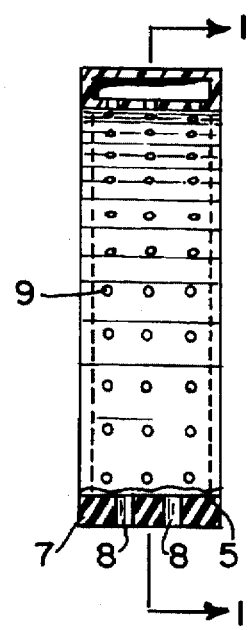
FIG. 2 is a cross section along line 2—2 in FIG. 1 with a partial cutaway to show drainholes.

The sound absorber according to the invention shown in FIGS. 1 and 2 is constructed as a wheel housing lining 1. The absorber is shaped like a long rectangle which is bent in semicircular manner. The sound absorber is constructed as a hollow body, whose cavity 2 extends over the entire surface of the wheel housing lining, the cavity 2 being enclosed by a front wall 3 directed towards the sound source, namely the wheel, a rear wall 4 directed towards the vehicle body, and narrow side walls 5. The cavity is empty and free from any partitioning, fillings, ribs, etc. The width of the wheel housing lining is approximately 25 cm. The length of the rectangle forming the wheel housing lining is approximately 120 cm and the internal spacing between the front wall 3 and the rear wall 4 is approximately 25 mm. From this a cavity volume of approximately 7.5 liters can be calculated. The front wall 3 of the wheel housing lining is constructed as a perforated plate in which is provided a plurality of parallel hole rows. The hole diameter is in each case 1.4 mm and the spacing between the hole centers is 9 mm. This corresponds to a percentage hole proportion of approximately 2% hole surface, relative to the front wall surface.

The material thickness of the front wall is approximately 1 mm. The front wall is made from polypropylene. The rear wall 4 is also made from polypropylene and its material thickness is also 1 mm. The side walls 5 are made from a permanent elastic, rubber-like material and allow an elastic vibration of the front wall 3 relative to the rear wall 4. On the lower side walls fixing straps 6 are provided for fixing the wheel housing lining to the body. At the deepest points 7 the side walls 5 also have water outlet holes 8 through which it is possible for any spray water which has penetrated the holes 9 in the front wall 3 to flow out.

In the fitted state the wheel housing lining leads to a good absorption of tire noise when the vehicle is moving. The high frequencies are absorbed by the holes 9 of the front wall 3, the cavity 2 serving as a common resonant chamber for all the holes. Although the front wall 3 is very narrow, as a result of its elastic suspension with respect to the rear wall it can be excited to vibrate by lower frequencies and therefore absorb the same. As a result of the elastic connection between the front wall 3 and the rear wall 4 noise caused by the impacting of spray water and small stones is effectively damped.

Figure 3:
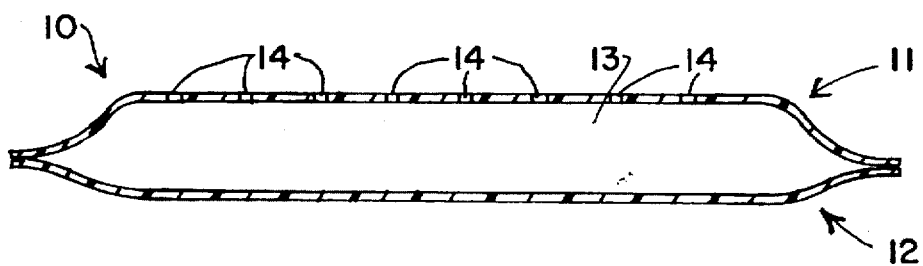
FIG. 3 is a diagrammatic cross section along line 3—3 in FIG. 4 through a sound absorber constructed as an engine cowling.
Figure 4:
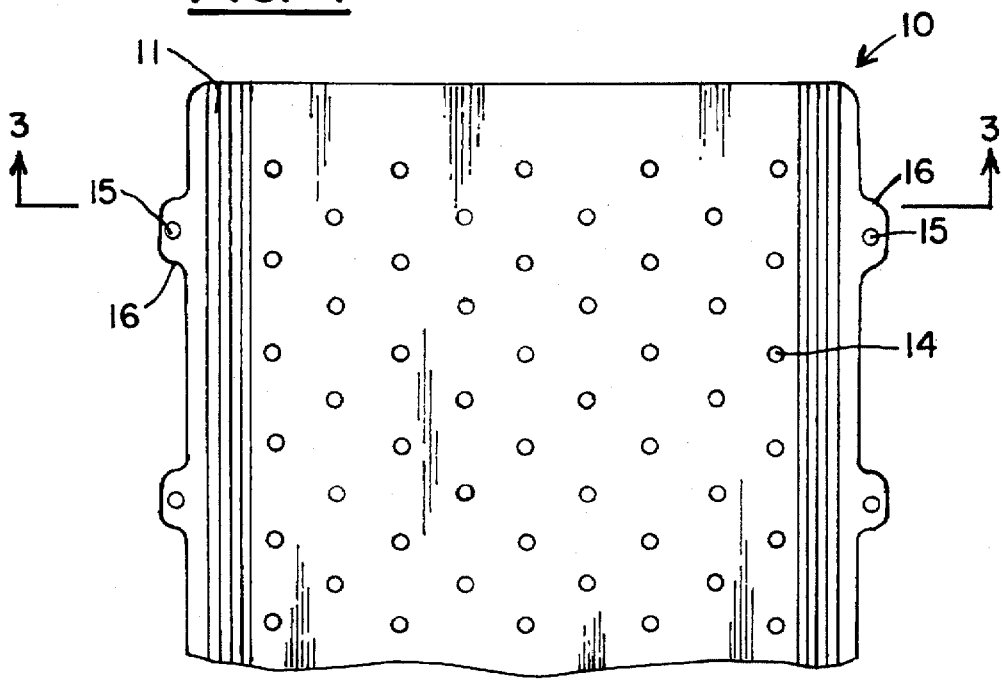
FIG. 4 is a plan view of the front of the embodiment of FIG. 3.

The embodiment of the invention shown in FIGS. 3 and 4 represents an engine cowling 10, in which a front wall 11 and a rear wall 12 are constructed as shell-like, three-dimensional, flat bodies and, accompanied by the inclusion of a cavity 13, are interconnected in a directly sealing manner by welding or mechanical connection. The engine cowling is used as a sound absorber which terminates the engine area at the bottom. The front wall 11 having the holes 14 is provided on the top and is directed towards the underside of the engine. The holes 14 in the front wall 11 are arranged in this embodiment in the form of staggered rows of holes. The front wall 11, despite its substantially rigid connection to the rear wall 12, can absorb vibrations, because it has large square dimensions. As a result of the three-dimensional shaping and/or optionally different hole sizes the front wall can also vibrate with different frequencies in different surface areas. The engine cowling has, in the marginal area in which the front and rear walls are welded together, shapes 16 provided with openings 15 which are used for fixing the engine cowling to the chassis. In much the same way as in the previously described embodiments, in the rear wall 12, which forms a closed underside of the engine cowling, holes can be provided at the deepest point, in order to permit the outflow of liquids which have penetrated the engine cowling. Alternatively or additionally it is possible to make the front wall of the absorber liquidtight, but noise-permeable, as well be described hereinafter, so as to prevent the penetration of liquid. In the engine cowling appropriately the rear wall 12 has a greater material thickness than the front wall 11 and can be 2 to 3 mm or more.

Figure 5:
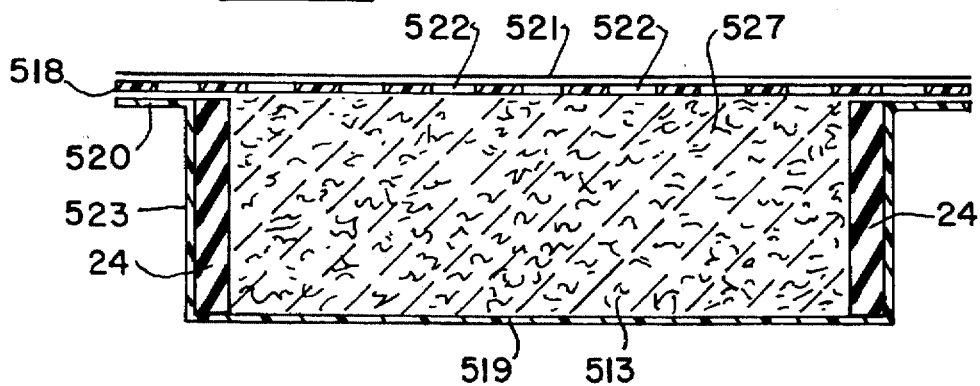
FIG. 5 is a diagrammatic cross section of an alternative embodiment of a sound absorber.
Figure 6:
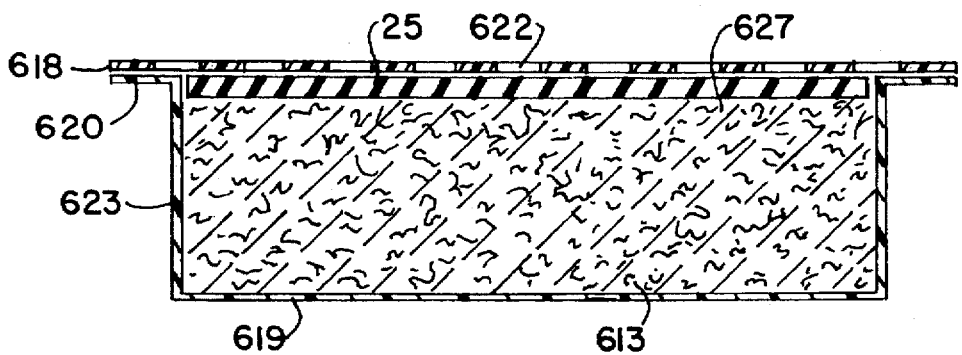
FIG. 6 is a diagrammatic cross section of another alternative embodiment of a sound absorber.
Figure 7:
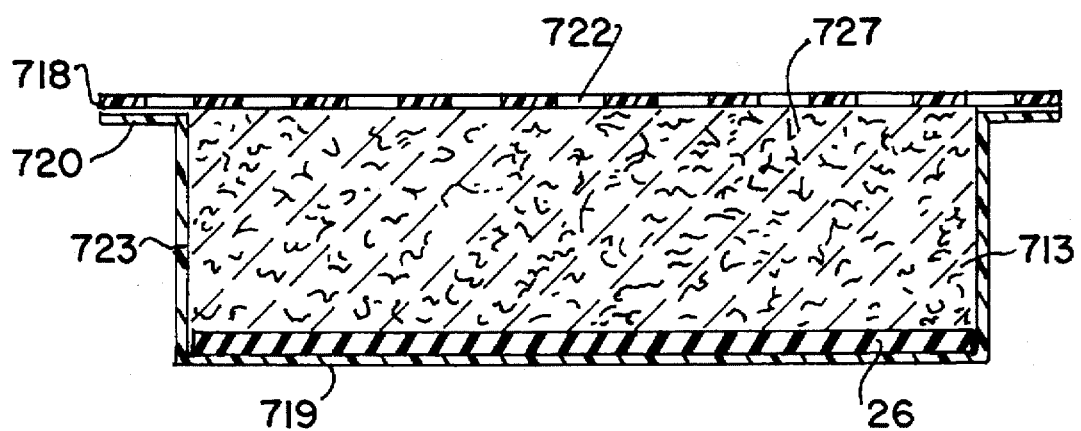
FIG. 7 is a diagrammatic cross section of another alternative embodiment of a sound absorber.

The embodiments of the invention shown in FIGS. 5 to 7 diagrammatically represent sound absorbers, in which the front wall 518, 618, and 718 is in each case constructed as a planar perforated plate. The rear wall 519, 619, and 719 is constructed as a flat shell or pot and there is a flange-like, outwardly projecting marginal area 520, 620, and 720 (see also FIG. 8, 820) for connection to the front wall 518, 618, and 718. The connection can be rigid or elastic. As shown in FIG. 5, the front wall 518 can be covered with a thin foil or sheet 521, which acts as a sound-permeable membrane, but closes the holes 522 of the front wall 518 in liquidtight manner. The sheet is flexible and can have a material thickness of about 50 μm. The sheet not only has a sealing action, but brings about additional and/or reinforced absorption in the desired frequency ranges and can, e.g., be made from polyester. Along the inner faces of the absorber side walls 523, 623, and 723 (see also FIG. 8, 823) sound-absorbing mats 24 can be placed, which dissipate sound energy which has penetrated the absorber cavity. The absorber cavity 513, 613, and 713 (see also FIG. 8, 813) can also be completely filled with sound-absorbing material, such as cotton fiber fleece. The absorption action is improved and, in desired manner, displaced towards lower frequencies. As a result of the closed absorber construction it can also be positioned at those points on vehicles which are exposed to wet and moisture, such as, e.g., the engine cowling. In place of the thin sheet or in addition thereto, it is also possible to place a nonwoven or fleece on the outside of the perforated front wall 518, 618 and 718. It can have a mass per unit area of 30 to 500 g/m². Such an external fleece additionally improves the absorption action. The external fleece can also be given a water-, oil-, and dirt-repelling form.

FIGS. 6 and 7 show open absorption systems, in which the holes 622 and 722 of the front wall 618, and 718 are open. In the embodiment of FIG. 6 the inside of the front wall 618 directed towards the interior of the absorber is covered over substantially the entire surface with an absorption mat 25, which is effectively able to absorb sound energy which has penetrated through the holes 622 of the front wall 618. Here again the interior of the absorber can be completely filled with sound absorbing material, particularly fibrous material.

The embodiment of FIG. 7 also contains an absorption mat 26, which in this embodiment is located on the inside of the rear wall 719. In the manner described relative to FIGS. 5, 6, and 7, the arrangement of the absorption mats can also be used in combined form, so that also larger surface parts or the entire inside of the absorber have sound-deadening properties. A complete filling of the interior or the cavity with absorber material is diagrammatically represented in FIGS. 5 to 7. As the embodiments according to FIGS. 6 and 7 have open front walls 618 and 718, said embodiments are used at those points of motor vehicles which remain dry.

Of course these embodiments as well can be covered with foils or the like on the open sides. In their design the absorbers can also be adapted to a predetermined shape. The shape as represented in the drawing serves merely as an illustration. The complete filling of the sound absorber can also be performed in such a manner as to fill the space 513, 613, and 713 on the one side completely with sound absorbing material 527, 627, and 727. Instead of the absorbing mats, in particular instead of the absorption mat 26 arranged on the rear wall 719 of the embodiment according to FIG. 7, there can be additional soft heavyweight layers 28 (see FIG. 8). Such heavyweight layers have a particularly high density. They can contact the corresponding wall, e.g., the rear wall 719 of the absorber casing, or even substitute that wall.

Figure 8:
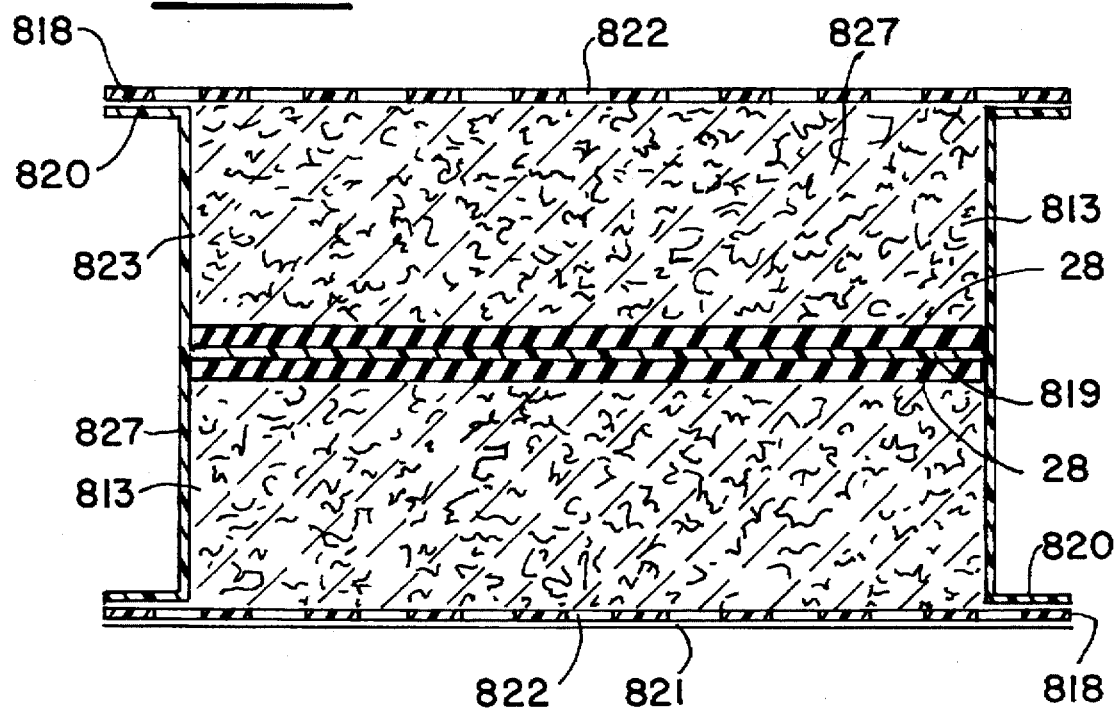
FIG. 8 is a diagrammatic cross section of another alternative embodiment of a sound absorber.

If the absorber according to the present invention is to act in two directions, it can be doubled substantially in mirror image, with one common rear wall 819 generally being sufficient. In FIG. 8 is illustrated such an embodiment which can serve as an engine cowling and as a motor encapsulation, and is substantially a redoubling of the embodiment according to FIG. 7. An upper absorber corresponds to the embodiment according to FIG. 7 with a soft heavyweight layer 28 provided on the inner side of the rear wall 819 and the remaining space 813 being filled with cotton fiber material 827. A lower absorber has a common rear wall 819 with the upper absorber which is also covered with a heavyweight layer 28 on its second side. The rear wall 819 as well can be omitted and a common heavyweight layer of appropriate thickness be provided. Additionally the holes 822 of the perforated front wall 718 are covered with a foil 821 so as to prevent penetration of dirty water. The open or upper absorber can face the engine and the lower or closed absorber can be directed outwards.

I claim:
1. Sound absorber for motor vehicles comprising:
   a double-wall, resonant body, said body having
      a vibratable front wall with a plurality of holes,
      a substantially unperforated rear wall, and
      a single cavity free from acoustic partitions that is shared by all of the holes, said single cavity being defined by said front wall and said rear wall;
   wherein the sound absorber acts as a combined plate/perforated resonator.

2. Sound absorber according to claim 1, wherein a total area of the plurality of holes is kept so small compared with a surface area of the front wall that only a part of an absorbed sound energy is dissipated in the holes, whereas another part of the sound energy is dissipated by vibrations of the front wall.

3. Sound absorber according to claim 1 wherein the resonant body further includes mechanical damping means and air enclosed in the single cavity, for damping vibrations of the front walls.

4. Sound absorber according to claim 1, wherein the front wall has a material thickness of 0.8 to 1.5 mm.

5. Sound absorber according to claim 1, wherein the front wall has a flexural rigidity of 1000 to 2500 N·mm².

6. Sound absorber according to claim 1, wherein said resonant body has a volume of 1 to 100 liters.

7. Sound absorber according to claim 1, wherein a total cross section of the plurality of holes of the front wall is below 10% of a surface of a front wall.

8. Sound absorber according to claim 1, wherein the holes have a spacing of 4 to 17 mm.

9. Sound absorber according to claim 1, wherein said resonant body further includes closed side walls, which interconnect the front and rear walls.

10. Sound absorber according to claim 1, wherein said double-wall body is constructed as a wheel housing lining for absorbing tire noise.

11. Sound absorber according to claim 1, wherein the front wall and the rear wall are substantially sealingly interconnected.

12. Sound absorber according to claim 1, further comprising elastic connecting means interconnecting the front wall and the rear wall.

13. Sound absorber according to claim 1, further comprising side walls which are at least partly made from rubber-elastic material and create an elastic connection between the front wall and the rear wall.

14. Sound absorber according to claim 1, further having drain openings at low points.

15. Sound absorber according to claim 14, wherein a total cross section of the drain openings is smaller than that of the plurality of holes of the front wall.

16. Sound absorber for motor vehicles comprising: a double-wall, resonant body, said body having
   a substantially unperforated rear wall,
   a means for absorbing low frequency sound, said means for absorbing low frequencies including a front wall means for vibrating in response to low frequency sound to be absorbed, and
   means for absorbing sound of a higher frequency than the low frequency sound, said means for absorbing sound of a higher frequency including a plurality of holes in said front wall means and a single cavity free from acoustic partitions that is shared by said plurality of holes and is defined by said rear wall and said front wall means.

* * * * *